(12) United States Patent  (10) Patent No.: US 9,417,791 B2
Meegan et al.  (45) Date of Patent: Aug. 16, 2016

(54) ACTIVE FEEDBACK INTERFACE FOR TOUCH SCREEN DISPLAY

(71) Applicant: Deere & Company, Moline, IL (US)

(72) Inventors: Robert Meegan, Urbandale, IA (US); Bruce Newendorp, Cedar Falls, IA (US); Joshua Hoffman, Davenport, IA (US); Kurtis Vander Wiel, Cedar Falls, IA (US); Sean McKay, Iowa City, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/188,762

(22) Filed: Feb. 25, 2014

(65) Prior Publication Data

US 2014/0292685 A1  Oct. 2, 2014

Related U.S. Application Data

(60) Provisional application No. 61/806,690, filed on Mar. 29, 2013.

(51) Int. Cl.
*G06F 3/041* (2006.01)
*G06F 3/0488* (2013.01)

(52) U.S. Cl.
CPC .......... *G06F 3/04883* (2013.01); *G06F 3/0488* (2013.01); *G06F 2203/04801* (2013.01)

(58) Field of Classification Search
CPC ........................................ G06F 3/041–3/04892
See application file for complete search history.

(56) References Cited

U.S. PATENT DOCUMENTS

| 4,914,624 A | 4/1990 | Dunthorn |
| 2008/0295015 A1 | 11/2008 | Liu et al. |
| 2010/0156656 A1 | 6/2010 | Duarte et al. |
| 2010/0177049 A1* | 7/2010 | Levy et al. ................... 345/173 |
| 2011/0057956 A1* | 3/2011 | Ranford ....................... 345/667 |
| 2011/0209099 A1 | 8/2011 | Hinckley et al. |

OTHER PUBLICATIONS

International Search Report and Written Opinion for corresponding international patent application No. PCT/US14/32152 mailed on Aug. 28, 2014.

* cited by examiner

*Primary Examiner* — Matthew Sim
(74) *Attorney, Agent, or Firm* — Harness, Dickey & Pierce, P.L.C.

(57) ABSTRACT

An active feedback interface for a touch screen display that includes display of visual cues to indicate when and where the display was touched by a user. The visual cues may change over a period of time in accordance with a particular active or inactive area of the touch screen contacted by a user finger.

15 Claims, 7 Drawing Sheets

ACTIVE FEEDBACK INTERFACE FOR TOUCH SCREEN DISPLAY

FIELD

The subject matter of the present specification relates to systems and methods for improving touch screen accuracy by a user by providing active user feedback. More specifically, the systems and methods described herein provide visual cues to a user to indicate when and where the display was touched.

BACKGROUND

Touch display screens that are responsive to localized touch contact are well known. Such devices include resistive sheets in which uniform orthogonal electric fields are generated. When a low resistance or ground connection is established at a particular location on the screen by touching, the location of touch is determinable. Such devices are utilized to create virtual buttons that, when touched, activate the virtual button to execute a pre-programmed operation.

Known touch screens are used in many applications, including hand-held mobile devices, automobiles, airplanes, and the like. More recently, such touch displays have found application in heavy equipment, including farming equipment. In certain applications, the ability to accurately select a desired virtual button or other portion of a touch screen may be hampered due to lighting conditions, vibration, etc., in the environment in which the display screen is installed.

SUMMARY

In an effort to overcome problems with known touch screens displays, the systems and methods described herein are designed around a touch interface that is intended to provide active feedback when engaged by a user of the display screen. To this effect, visual cues are used to indicate when and where the display was touched by a user. For example, the systems and methods described herein may operate upon release of a touch from the display screen to activate a virtual button on the touch screen, rather than upon touch, thereby improving user accuracy of the device by allowing the operator the opportunity to correct a finger position, if needed without activating an unintended or unwanted operation by the errantly selected button.

As used herein, the word "touch" is intended to imply a touch and release sequence of a user finger, such as by a "tap" of the finger on the touch screen, unless otherwise specifically noted. Although, a "tap" is used as an example touch and release, it will be understood by those of skill in the art that other gestures are possible to operate a touch screen that include, but are not limited to, a double tap, a drag/slide motion, a flick, a nudge, a pinching motion, a finger spreading motion, etc.

In an exemplary embodiment, when an operator touches a touch screen, regardless of whether or not the area touched contains an active element, the system creates a "water drop" effect that consist of a solid or translucent circle (e.g., a gray circle) centered on the point on the screen of the touch. In an example embodiment, the displayed circle may have a first size upon contact of a user finger with the screen and then shrink in diameter and disappears over a preset period of time, such as approximately one second after the touch. Although, a one second period is described during which the circle shrinks in diameter and disappears, it will be understood by those of skill in the art that other time periods may be established without departing from the scope of the present specification and claims.

In an example embodiment, when the operator touches (without releasing) an active element of the touch screen, the active element will change from a first color to a second color to indicate to the operator which active element has been touched. If the finger of the operator is moved/dragged to another element, whether active or inactive, the original element returns to its normal color and the new element does not change color or become active unless the user's finger is first released from the screen. In this way, the operator may remove a finger from a mis-targeted element without engaging/activating the element thereby assuring that an unwanted element is not activated.

BRIEF DESCRIPTION OF THE DRAWINGS

The subject matter of the present specification will now be explained in more detail using exemplary embodiments, which are not exclusive, and with reference to the attached drawings, in which.

DETAILED DESCRIPTION OF EXEMPLARY EMBODIMENTS

Figure 1:
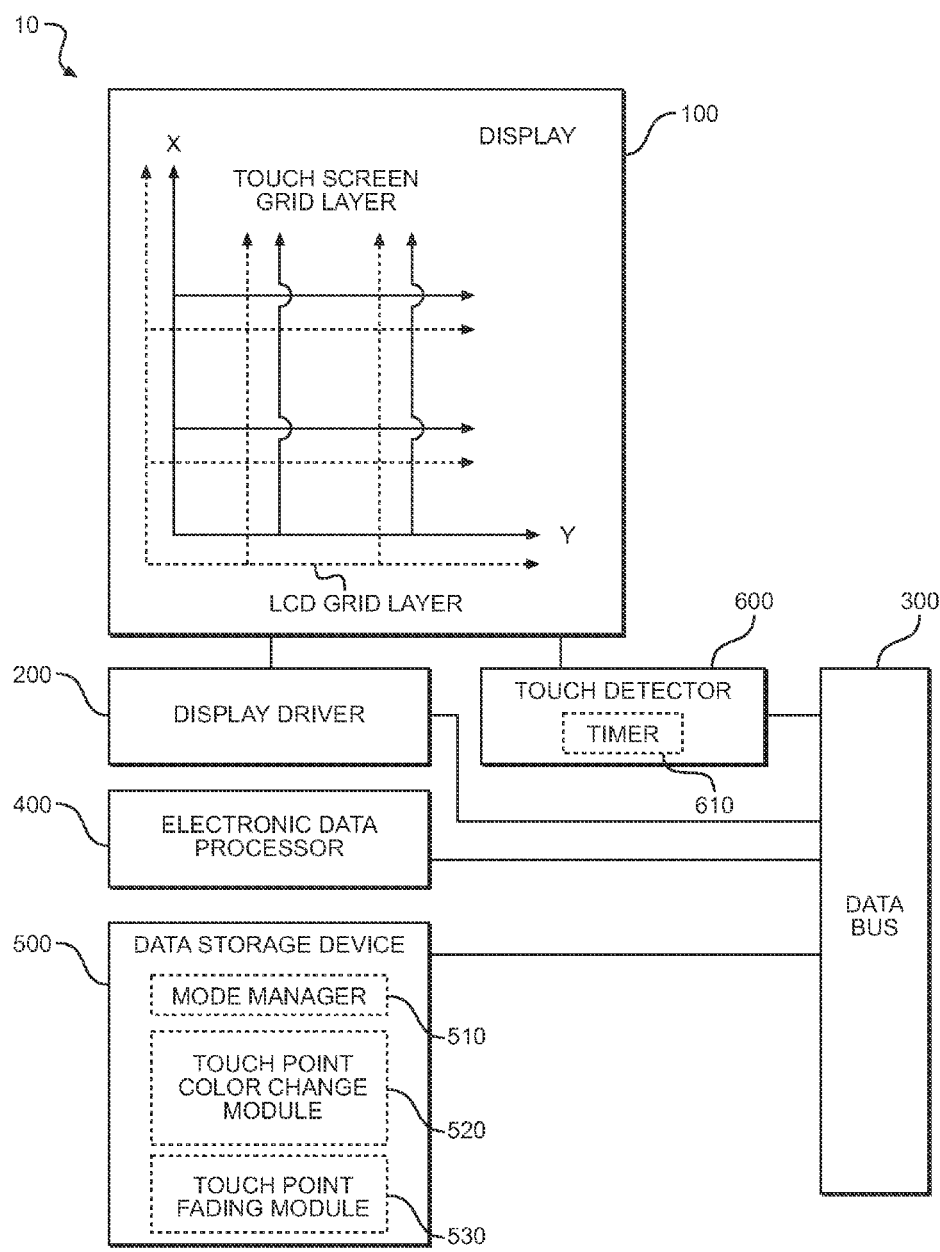
FIG. 1 shows a schematic diagram of an example embodiment of a computing system configured in accordance with subject matter disclosed herein.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the following description, illustrative embodiments may be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

In an exemplary embodiment, the active feedback interface for a touch screen display described herein may be installed in a piece of heavy equipment including, but not limited to, farming equipment. When installed in farming equipment, such as a tractor, the touch screen may provide a user interface for performing various operations of the tractor. For example, the touch screen may implement operator directives to direct the tractor, and/or various peripheral pieces of equipment installed thereon or connected thereto, to till a field, plant a crop, fertilize a field, etc. It is noted that although a tractor is described in conjunction with the systems and methods of the present document, other vehicles, installations and environments of use are considered to be within the scope of the present specification and claims.

Due to operating conditions of a tractor, or other equipment, implementing a touch screen control system as described herein, difficulties may arise in operating a touch screen display that include bright ambient light, glare, vibration, bouncing, and the like, that may cause the operator difficulties in seeing/and or selecting an intended portion of a touch screen. The active feedback interface for a touch screen display described herein alleviates such difficulties by providing the operator with active visual feedback when the display is engaged by an operator. For example, such visual cues are used to indicate when and where the display was or is presently being touched thereby improving user accuracy of the device by allowing the operator the opportunity to correct a finger position, if needed.

FIG. 1 shows a schematic diagram of an example embodiment of a computing system 10 configured in accordance with subject matter disclosed herein. As shown in FIG. 1, an exemplary embodiment of the active feedback interface for a touch screen display includes a touch screen-type display 100 having a sensor grid. The touch screen display 100 displays visual output (such as virtual buttons) to the user (FIG. 3). The visual output may include graphics, text, icons, video, and/or any combination thereof (collectively termed "graphics"). In addition to providing a display function, the touch screen display 100 also provides an input interface and an output interface between the system 10 and the environment in which the system 10 is installed, such as the tractor described above that is controlled by the operator via the system 10.

Figure 2:
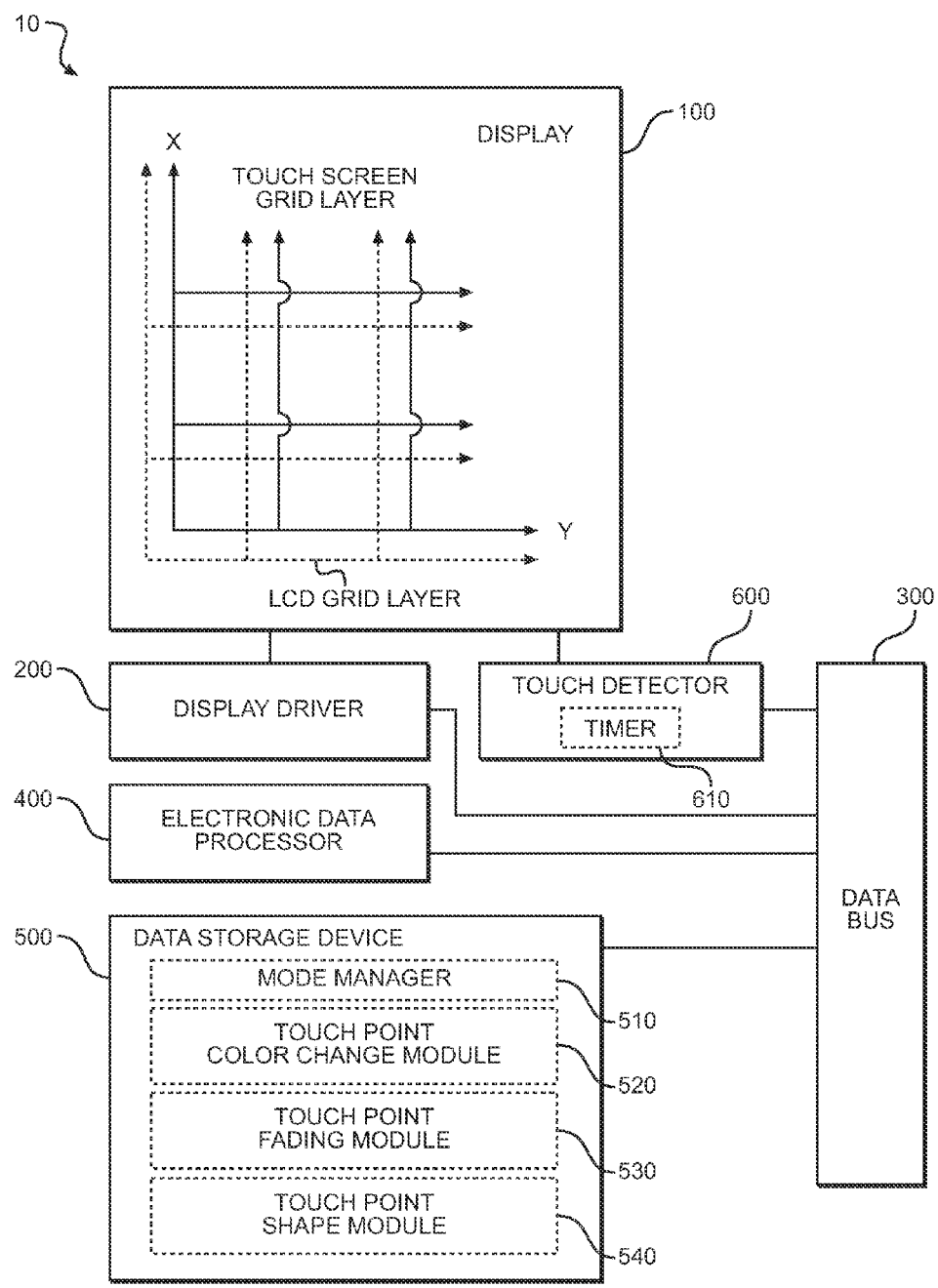
FIG. 2 shows a schematic diagram of an example embodiment of a computing system configured in accordance with subject matter disclosed herein.

The touch screen display 100 includes a touch-sensitive surface that accepts input from an operator based on touch contact (e.g., a finger). The touch screen is operatively connected to display driver or controller 200, a data bus 300, and a processor 400, that control various functions that may be selected by a user through the touch screen display 100. A data storage device 500 may include, among other things, various modules having instructions related to characteristics of visual cues that are displayed on the display screen 100. In various exemplary embodiments, the data storage device 500 may include a touch point color change module 520 configured to control a change in color to an aspect of the display screen 100 as a visual cue to a user and a touch point fading module 530 configured to control a change in a visual cue as fading over a period of time (FIG. 1). As shown in an alternate embodiment in FIG. 2, the data storage device 500 may further include a touch point shape module 540 configured to control the shape of a visual cue displayed on the touch screen 100. In each of the embodiments, the modules 520, 530, 540 are managed by a mode manager 510 of the data storage device 500.

In an example embodiment, the data storage device 500 may further include high-speed random access memory and/or non-volatile memory, such as one or more magnetic disk storage devices, optical disk storage devices, flash memory devices, or other non-volatile solid-state memory devices. In an example embodiment, the data storage device 500 may include a mode manager 510 to manage various modes stored therein.

In various example embodiments, additional software components (instructions) stored in the data storage device 500 may include one or more of an operating system, a communication module, a graphics module, a text input module, a Global Positioning System (GPS) module, and various applications. The operating system may include various software components and/or drivers for controlling and managing general system tasks (e.g., memory management, storage device control, power management, etc.) and facilitates communication between various hardware and software components.

The touch screen display 100 is further operably connected to a touch detector 600 that includes a timer 610. The touch detector 600 detects a touch on the display 100 and may activate the associated timer 610 as described in more detail below.

The display driver 200 is configured to send signals to and receives signals from the touch screen 100. The touch screen 100 and the display driver 200, as well as the associated instruction modules 520, 530, 540 stored in a memory of the data storage device 500, interact to detect a touch and a touch removal on the touch screen 200 and convert the detected interaction within active area of the touch screen, such as virtual buttons that are displayed on the touch screen 100, to execute a particular operation in accordance with a programmed function. In an exemplary embodiment, a point of contact between the touch screen 100 and the user corresponds to a finger of the user.

The touch screen display 100 may use LCD (liquid crystal display) technology, or LPD (light emitting polymer display) technology, although other display technologies may be used in other embodiments. The touch screen display 100 and the display controller 200 may detect contact and any movement or breaking thereof using any known touch sensing technologies to determine one or more points of contact with the display 100.

As discussed above, the data storage device 500 is operatively connected to the data bus 300 and the data processor 400. The data processor 400 is configured to execute various software programs and/or sets of instructions stored in the data storage device 500 to perform various functions of the systems implemented by the touch screen display 100 and to process data.

Figure 3A:
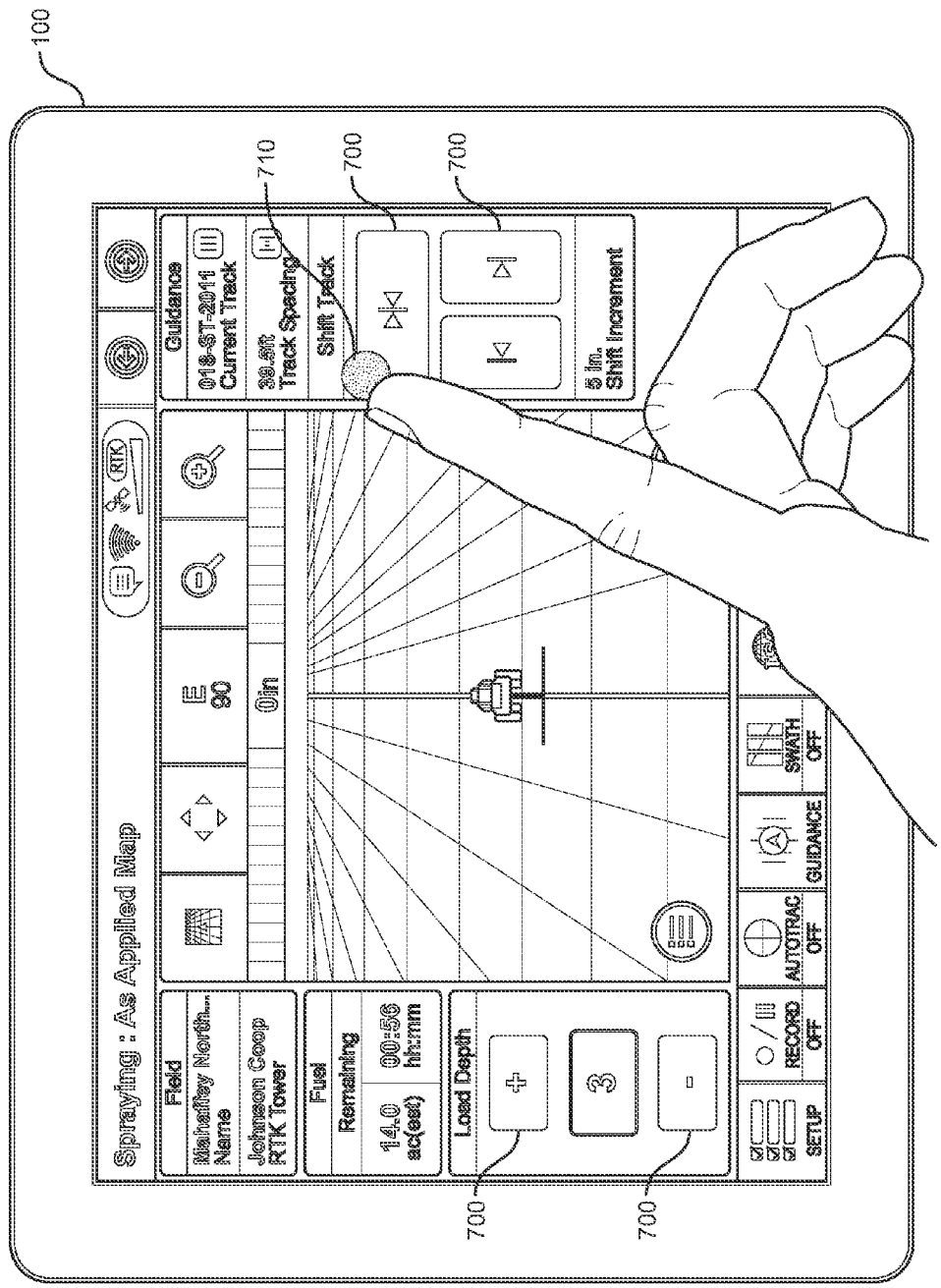
FIGS. 3A and 3B show schematic representations of a touch display screen configured in accordance with subject matter disclosed herein.

FIG. 3A shows an example touch screen display 100 having a plurality of user activatable virtual buttons 700 to implement/control various operations that may be performed by instructions stored in the data storage device 500. In an exemplary embodiment, the functions implemented by the virtual buttons 700 are activated by the release of touch contact (i.e., removal of a finger from the button).

As discussed above, under certain conditions, the visibility of the touch screen display 100 may be hampered by lighting conditions, vibration, bouncing, etc., which in turn hampers the operators ability to accurately select a desired function via a desired virtual button 700. Moreover, in certain vehicles in which a touch screen display is installed, accurate selection of a desired virtual button 700 may also be difficult due to movement of the vehicle itself and/or the operator within the vehicle. For example, when the system 10 is installed in a tractor, the vehicle may move in a rough and uneven manner. Accordingly, when the vehicle operator seeks to select a particular virtual button 700 the finger of the operator may be misplaced on the display 100 in such a manner that the finger touches an inactive portion of the screen or an undesired virtual button 700.

In accordance with the systems and methods herein, a touch interface is provided that gives active feedback to the operator. In particular, visual cues in the form and manner discussed herein are used to indicate when and where the display was touched by a user. As shown in FIG. 3A, an operator touching a virtual button 700 will receive a first visual cue 710 designating an area touched by the operator's finger. In an example embodiment, the first visual cue 710 may be a circle. A center of the first visual cue 710 is aligned to the center XY coordinates of the touch screen sensor grid touched by a user.

Upon touch contact with the screen of the display 100, a signal is sent from the display 100 to the display driver 200 and to the touch detector 600. The signal to the driver 200 is passed to the processor 400 and the data storage device 500 where the signal is processed. An instruction is sent from the processor 400 to the display 100 that includes a display signal of the first visual cue 710 at the location of the touch. In an example embodiment, a signal may be sent from the touch point shape module 540 to display a circle as the first visual cue 710 on the display screen 100 at the point of contact. The display of the first visual cue 710 and the detection of the touch also triggers a countdown timer 610 by the touch detector 600 discussed in more detail below.

Selection of Active Area

In the example shown in FIG. 3A, the user finger is on an active area or virtual button 700 of the display 100. Upon touch of the virtual button 700, therefore, an additional instruction is sent from the processor 400 to the display 100 that includes a display signal of a second visual cue 720 (FIG. 3B) at the location of the touch. In this example, the second visual cue 720 is a change in color and/or brightness of the virtual button 700 controlled in accordance with the touch point color change module 520 to alert the operator that a particular active area of the screen has been touched. It should be noted that operation of the functionality of the selected virtual button 700 has not yet been executed because the operator's finger has not yet been released from the button 700. Rather, the operator is alerted to selection of an active portion of the display screen that will result in a concomitant operation upon release of the touch.

In an example embodiment, the first visual cue 710 may change color to indicate that the touch is on a virtual button 700. In other words, upon an initial touch of the virtual button 700, the first visual cue will change from a first color denoting a point of contact with the screen, to a second color alerting the operator that the touch is placed on an active portion of the screen. In yet a further embodiment, both the first visual cue and the second visual cue may change colors in the respective manner described above.

Figure 5:
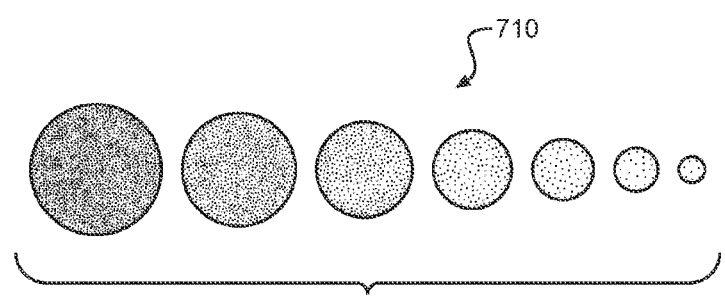
FIG. 5 shows an example embodiment of a visual cue.

The display of first visual cue 710 and/or the detection of the touch also triggers the countdown timer 610 by the touch detector 600. In an example embodiment, the countdown period may be any predetermined time period programmed into instructions stored in the data storage module 500. In the event the operator does not lift the finger from the touched area within countdown period, the first visual cue 710 will change to alert the operator that the virtual button 700 has not been activated because the operator's finger has not been removed from the button. In an example embodiment, the first visual cue 710 may progressively decrease in size/scale and/or disappear completely (see FIG. 5) in accordance with the touch point fading module 530.

Figure 3B:
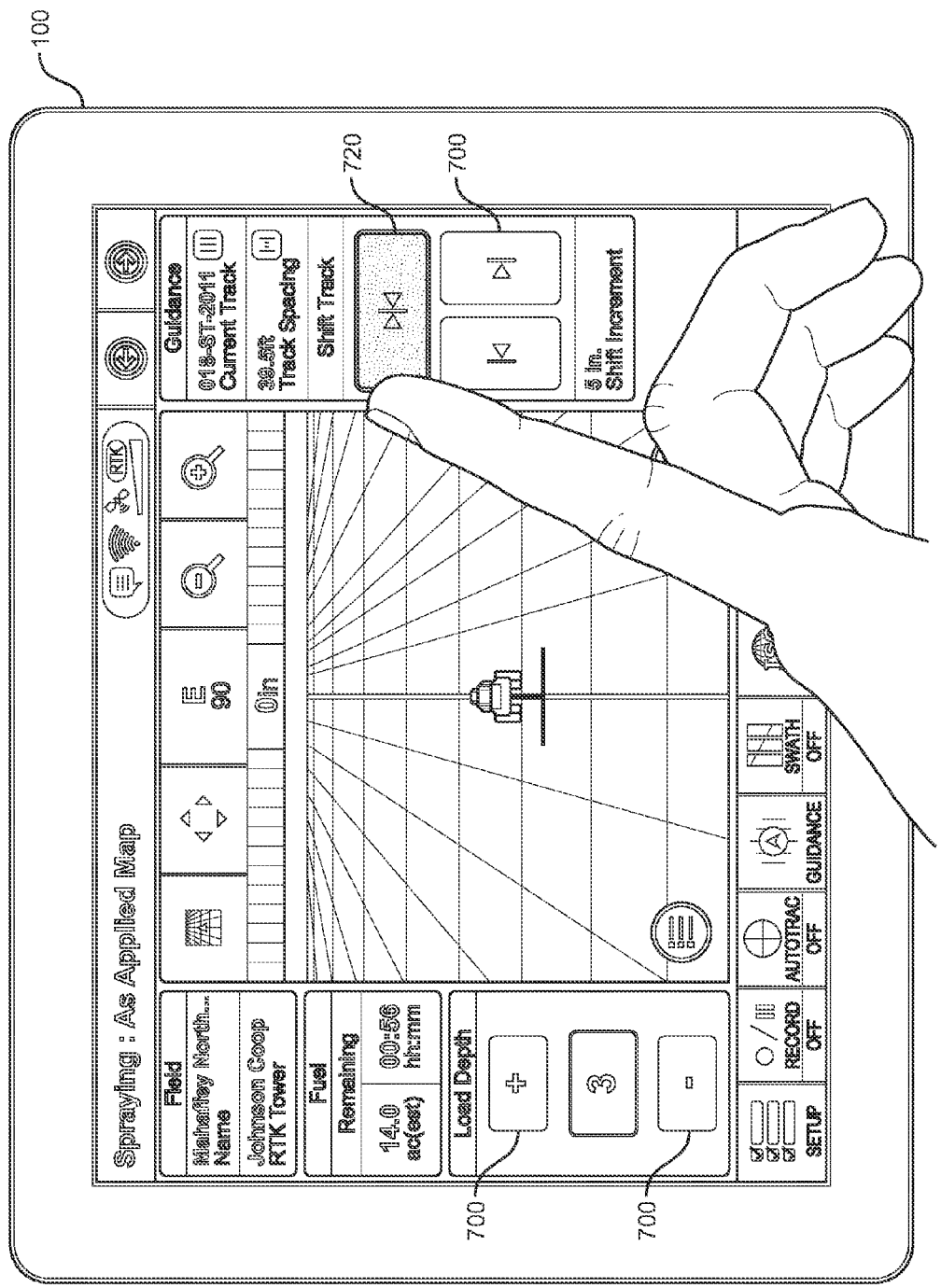
Figure 4A:
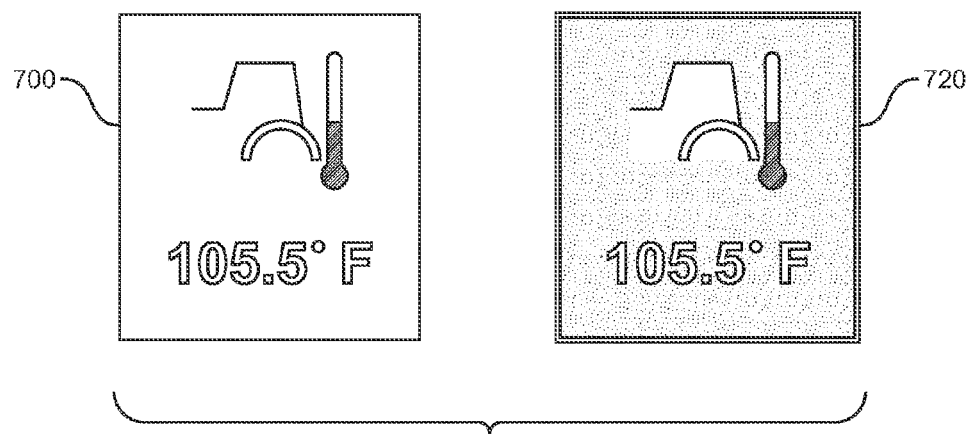
FIGS. 4A and 4B show example embodiments of a visual cue.
Figure 4B:
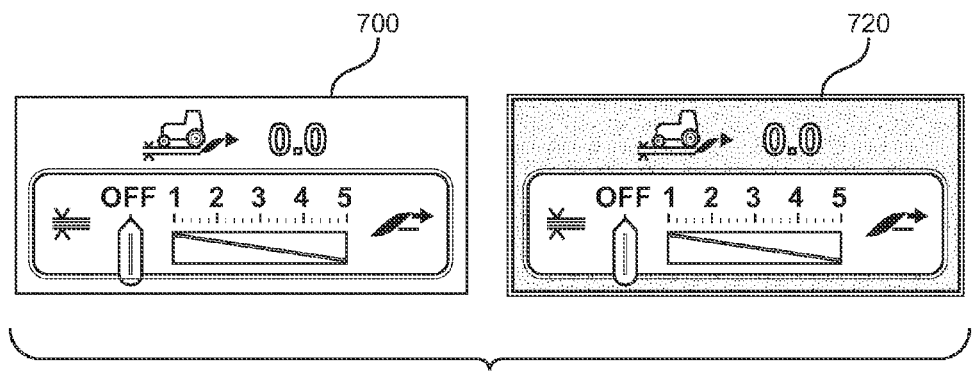

In an example embodiment, if the operator does not remove the finger from the button 700 within the countdown period (i.e., before the change in the visual cue 710 is completed), a signal will be sent from the touch detector 600 to the processor and the processor 400 will terminate the second visual cue 720 as shown in FIG. 3B (i.e., the color and/or brightness will return to its previous non-selected state) and the operation executed by selection of the button 700 will not be performed. In the event the operator's finger is removed from the button 700 within the countdown period, the operation of the selected button 700 will be executed. Additional examples of a second visual cue are shown at FIGS. 4a, 4b.

Although the first visual cue 710 is shown and discussed as a circle, visual cues of other shapes, sizes, styles, etc. are contemplated herein and considered to be within the scope of this disclosure and the accompanying claims. Similarly, although the termination of the countdown period is shown visually to the operator as a decrease in the size of the first visual cue, other means of identifying the termination of the countdown period are considered herein including but not limited to a fading of the visual cue, an increase in size of the visual cue, the visual cue fragmenting, etc. Moreover, one of skill in the art will recognize that the respective visual cues may be of various colors as additional visual cues to the operator. In various exemplary embodiments the change in the first visual cue 710 may occur concurrently with a change in the countdown period or at the termination of the countdown period without departing from the scope of the present specification and claims.

Selection of Inactive Area

In the event that an operator's touch on the display 100 is misplaced due to visual obscuration of the display 100 and/or movement of the operator and/or vehicle in which the touch screen display 100 is installed such that the operator's touch is on an inactive portion of the display, a signal is sent from the display 100 to the touch detector 600, the processor 400 and the data storage device 500 where the signal is processed. An instruction is sent from the processor 400 to the display 100 that includes a display signal of the first visual cue 710 at the location of the touch to alert the operator of the location of the touch on the display 100. The display of the first visual cue 710 and the detection of the touch also trigger the countdown timer 610 of the touch detector 600.

In the event the operator does not lift the finger from the inactive touched area within the countdown period, the first visual cue 710 will not change color and will progressively decrease in size/scale and/or disappear completely (see FIG. 5) in accordance with the touch point fading module 530 to alert the operator that an active portion of the display 100 has not been activated. The operator may then correct positioning of the touch to the proper location.

Move from a First Area to a Second Area

Figure 6:
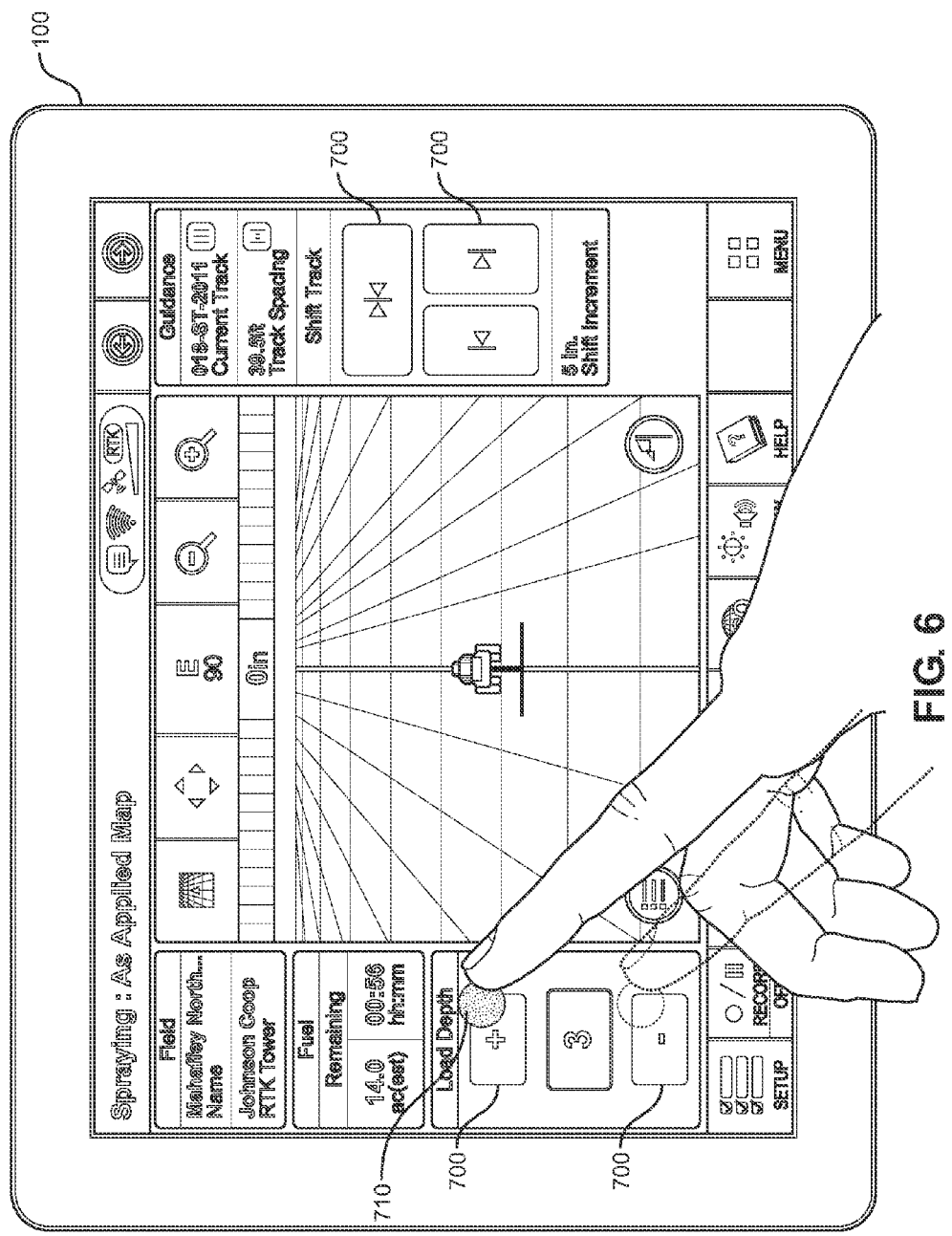
FIG. 6 shows a schematic representation of a touch display screen configured in accordance with subject matter disclosed herein.

In the event the operator misplaces a finger to an inactive area on the display screen 100 or an incorrect virtual button as described above (as shown by the finger in "broken line" in FIG. 6), the operator is alerted to the error by the first visual cue 710 and may then simply drag the finger to the desired active location on the display 100, such as a virtual button 700 (FIG. 6). Because the finger has not been lifted from the touch screen display due to the drag motion, the operation performed by the incorrectly selected virtual button 700 is not executed. Further, dragging the finger to the desired active location will not result in activation of the desired button when the button is released. Rather, the operator's finger must first be released from the touch screen 100 and then touch and release the desired button 700 to actually execute the function performed by the selected button 700. In this way, errant selection is avoided.

Upon detection of the operator's finger on the desired active portion of the screen 100, a signal is sent from the display 100 to the display driver 200 and to the touch detector 600. The signal is processed as described above such that the proper first visual cue 710 and/or second visual cue 720 are selected in accordance with one or more of the modules 520, 530, 540 (see finger represented in solid line in FIG. 6). An instruction is sent from the processor 400 to the display 100 that includes a display signal of the first visual cue 710 at the location of the touch. The display of the first visual cue 710 and the detection of the touch also trigger the countdown timer 610 by the touch detector 600.

Because the operator's finger has been moved to an active location of the screen 100 (FIG. 6), a second visual cue 720 will be displayed at the location of the touch as discussed above. In the event the operator does not lift the finger from the newly touched active area within countdown period, the first visual cue 710 will change in accordance with the systems and methods discussed above to alert the operator that the virtual button 700 has not been activated because the operator's finger has not been removed from the button.

In an example embodiment, if the operator does not remove the finger from the button 700 within the countdown period (i.e., before the change in the visual cue 710 is completed), a signal will be sent from the touch detector 600 to the processor 400 and the processor 400 will terminate a second visual cue 720 as shown, for example, at FIGS. 4A, 4B (i.e., the color and/or brightness will return to its previous non-selected state) and the operation executed by selection of the button 700 will not be performed).

In the event the operator has placed a finger on an active portion of the display screen 100 and is alerted of the action by the display of the first and second visual cues 710, 720, the operator may determine that an incorrect active portion of the display, such as an incorrect virtual button 700, has been selected. In such a case, the operator may simply slide the finger touching the display 100 to the correct, desired button 700. Because the finger has not been lifted from the touch screen display 100, the operation performed by the incorrectly selected virtual button 700 is not executed. Rather, as discussed above, because the operator is alerted by the first and/or second visual cues, the operator obtains active feedback from the touch screen display 100 and may correct the error without activating an unwanted operation.

In accordance with the systems and methods described herein, user accuracy of a touch screen operated device is improved by providing visual cues to the user thereby allowing the user the opportunity to correct a finger position on the display, if needed. In at least one exemplary embodiment, the systems and methods described herein are designed around a touch interface that is intended to provide active feedback when engaged by the operator. To this effect, visual cues are used to indicate when and where the display was touched by a user. Greater control and safety is also provided by the systems and methods described herein by implementing operation of a certain function upon release of a touch from the display screen rather than upon a touch. By implementing operation by release of a touch, the user is provided the opportunity to correct a finger position, if needed without activating an unwanted and/or unintended operation.

Figure 7:
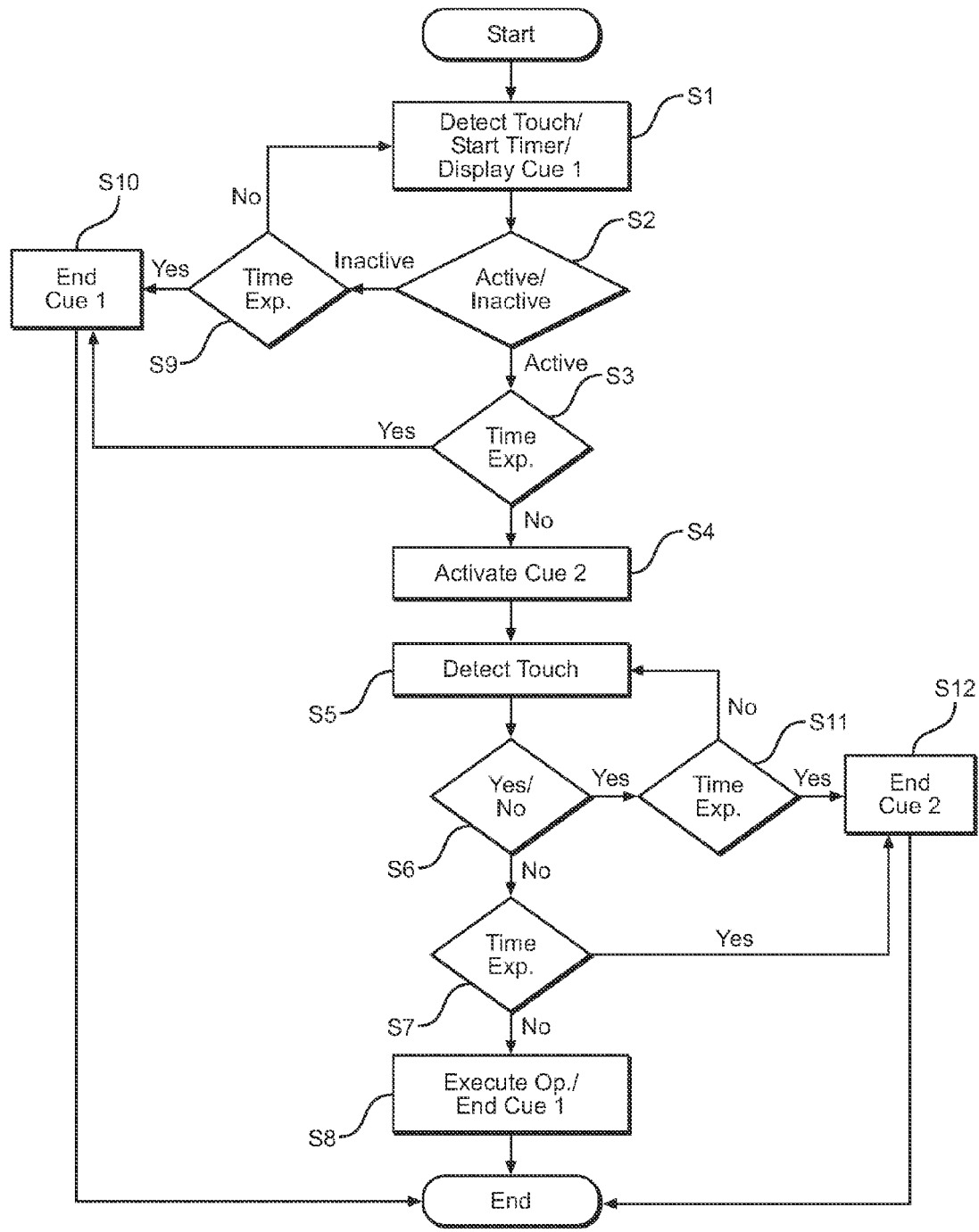
FIG. 7 shows a flowchart of an example embodiment of a process in accordance with subject matter disclosed herein.

FIG. 7 shows a flowchart of an example embodiment of a process in accordance with subject matter disclosed herein. As shown in FIG. 7, the process begins and proceeds to step S1 where a touch to a touch screen display is detected. Upon detection of the touch, a countdown timer is activated and a first visual cue is displayed on the touch screen at the point of the detected contact whereupon the process proceeds to step S2.

At step S2, a determination is made as to whether the detected touch of step S1 is in an active area or an inactive area of the touch screen display. In an example embodiment, an active area of the touch screen display may correspond to a virtual button assigned a specific task to execute a predetermined operation. If it is determined that the detected touch of step S1 is in an inactive area, the process proceeds to step S9 where it is determined if the timer of step S1 has expired. If the timer has expired (YES at step S9), the process proceeds to step S10 where the first visual cue is terminated and the process ends. If the timer at step S9 (NO at step S9) has not terminated, the process continues to step S1 to detect a touch on the touch screen display. If it is determined that the detected touch of step S1 is in an active area, the process proceeds to step S3.

At step S3 a determination is made as to whether the timer that was started in step S1 has expired. If the timer has expired (YES at step S3), the process proceeds to step S10 whereupon display of the first visual cue is terminated and the process ends. If the timer has not expired (NO at step S3) the process continues to step S4 where a second visual cue is displayed on the touch screen display and the process continues to step S5.

At step S5 it is determined if the touch detected at step S1 remains on the active area of the screen as determined at step S2. If the detected touch remains (Yes at step S6), the process continues to step S11 whereupon it is determined if the timer started at step S1 has expired. If the timer has expired (YES at step S11) the process continues to step S12 where the second visual cue is terminated and the process ends. If the timer started at step S1 has not expired (NO at step S11), the process returns to step S5.

If at step S5, there is no longer a touch detected (NO at step S6), the process continues to step S7 where it is determined if the timer started at step S1 has expired. If the timer has not expired (NO at step S7) the process continues to step S8 where the operation of the active area is executed, the first visual cue is terminated and the process ends. If the timer started at step S1 has expired (YES at step S7) the process continues to step S12 where the second visual cue is terminated and the process ends.

The general concept stated herein may be changed and/or modified without departing from the model defined in this document. Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A method of providing active feedback to a user of an interface for a touch screen display, comprising:
   detecting a touch to at least one of an active area and an inactive area of a touch screen display;
   starting a timer upon detection of the touch;
   displaying a first visual cue of the touch screen display upon detection of the touch;
   terminating the first visual cue upon expiration of a period controlled by the timer; and
   executing a function activated, by a symbol displayed on the touch screen prior to the detection of the touch, upon release of the touch on the symbol and prior to expiration of period controlled by the timer,
   wherein displaying includes displaying the first visual cue at a first location on the touch screen, and subsequently displaying the first visual cue at a second location without releasing the touch;
   detecting a release of the touch from the second location without activating a function controlled by the second location, and
   after releasing the touch from the second location, touching and releasing the touch from the second location thereby activating the function controlled by the second location.

2. The method of claim 1, further comprising displaying a second visual cue on the touch screen display when the detected touch is in an active area of the touch screen display.

3. The method of claim 2, further comprising terminating the second visual cue upon expiration of period controlled by the timer.

4. The method of claim 1, wherein terminating includes terminating a period started by the timer upon detection of the touch.

5. The method of claim 1, wherein terminating further includes terminating the first visual cue upon expiration of period controlled by the timer and before the touch is removed from the touchscreen.

6. A non-transitory computer readable medium including program segments for, when executed on a computer device, causing the computer device to:
   detect a touch to at least one of an active area and an inactive area of a touch screen display;
   start a timer upon detection of the touch;
   display a first visual cue of the touch screen display upon detection of the touch;
   terminate the first visual cue upon expiration of a period controlled by the timer; and
   execute a function activated, by a symbol displayed on the touch screen prior to the detection of the touch, upon release of the touch on the symbol and prior to expiration of period controlled by the timer, wherein
   causing the computer device to display further includes display of the first visual cue at a first location on the touch screen, and subsequent display of the first visual cue at a second location without releasing the touch, and wherein when executed on a computer device, the program segments further cause the computer device to:
   detect a release of the touch from the second location without activating a function controlled by the second location, and
   after detecting the release of the touch from the second location, detecting touching and releasing of the touch from the second location thereby activating the function controlled by the second location.

7. The non-transitory computer readable medium of claim 6, further comprising program segments for, when executed on a computer device, causing the computer device to display a second visual cue on the touch screen display when the detected touch is in an active area of the touch screen display.

8. The non-transitory computer readable medium of claim 7, further comprising program segments for, when executed on a computer device, causing the computer device to terminate the second visual cue upon expiration of period controlled by the timer.

9. The non-transitory computer readable medium of claim 6, wherein the program segment that causes the computer device to terminate the first visual cue further causes the computer to terminate a period started by the timer upon detection of the touch.

10. The non-transitory computer readable medium of claim 6, wherein the program segment that causes the computer device to terminate the first visual cue upon expiration of period controlled by the timer and before the touch is removed from the touchscreen.

11. A computing system for active feedback in a touch screen display, comprising:
a touch screen display;
a display driver;
a touch detector;
a timer;
a processor;
a data storage device including instructions that, when executed by the processor, cause the touch screen display to detect a touch to at least one of an active area and an inactive area of a touch screen display; start the timer upon detection of the touch; display a first visual cue on the touch screen display upon detection of the touch; terminate the first visual cue upon expiration of a period controlled by the timer; and execute a function activated, by a symbol displayed on the touch screen prior to the detection of the touch, upon release of the touch on the symbol and prior to expiration of period controlled by the timer, wherein causing the display further includes causing the display of the first visual cue at a first location on the touch screen, and subsequent display of the first visual cue at a second location without releasing the touch, and wherein the data storage device further includes instructions that, when executed by the processor, cause the touch screen display to:
detect a release of the touch from the second location without activating a function controlled by the second location, and
after detecting the release of the touch from the second location, detecting touching and releasing of the touch from the second location thereby activating the function controlled by the second location.

12. The computing system of claim 11, wherein the data storage device further includes instructions that, when executed by the processor, cause the touch screen display to display a second visual cue on the touch screen display when the detected touch is in an active area of the touch screen display.

13. The computing system of claim 12, wherein the data storage device further includes instructions that, when executed by the processor, cause the touch screen display to terminate the second visual cue upon expiration of period controlled by the timer.

14. The computing system of claim 11, wherein the data storage device further includes instructions that, when executed by the processor, cause the touch screen display to terminate a period started by the timer upon detection of the touch.

15. The computing system of claim 11, wherein the program segment that causes the computer device to terminate the first visual cue further causes the computer to terminate the first visual cue upon expiration of period controlled by the timer and before the touch is removed from the touchscreen.

* * * * *